United States Patent
Versino et al.

(10) Patent No.: US 10,823,850 B2
(45) Date of Patent: Nov. 3, 2020

(54) MEASURING DEVICE

(71) Applicant: Illinois Tool Works Inc., Glenview, IL (US)

(72) Inventors: Anthony M. K. Versino, Buffalo Grove, IL (US); Michael Dill, Elk Grove Village, IL (US); Victor Truong, Chicago, IL (US); John W. Croll, Chicago, IL (US); Yash Siddhartha, Chicago, IL (US); Sakif B. Ferdous, Skokie, IL (US)

(73) Assignee: Illinois Tool Works Inc., Glenview, IL (US)

( * ) Notice: Subject to any disclaimer, the term of this patent is extended or adjusted under 35 U.S.C. 154(b) by 347 days.

(21) Appl. No.: 15/819,764

(22) Filed: Nov. 21, 2017

(65) Prior Publication Data

US 2018/0156915 A1    Jun. 7, 2018

Related U.S. Application Data

(60) Provisional application No. 62/428,754, filed on Dec. 1, 2016.

(51) Int. Cl.
| | | |
|---|---|---|
| *G01S 15/08* | (2006.01) | |
| *G01S 7/56* | (2006.01) | |
| *G01B 11/02* | (2006.01) | |
| *G01S 15/02* | (2006.01) | |
| *G01S 7/521* | (2006.01) | |

(52) U.S. Cl.
CPC ............ *G01S 15/08* (2013.01); *G01B 11/026* (2013.01); *G01S 15/02* (2013.01); *G01S 7/521* (2013.01); *G01S 7/56* (2013.01)

(58) Field of Classification Search
CPC .......... G01S 15/02; G01S 7/521; G01S 15/08; G01B 11/026
USPC ...................................... 367/87, 99; 73/629
See application file for complete search history.

(56) References Cited

U.S. PATENT DOCUMENTS

| | | | | |
|---|---|---|---|---|
| 4,677,599 A | * | 6/1987 | Obayashi | G01S 15/08 367/97 |
| 4,926,693 A | * | 5/1990 | Holm-Kennedy | B60G 17/01933 367/102 |
| 6,925,296 B2 | * | 8/2005 | Mattisson | H04M 1/6016 367/118 |
| 2002/0130770 A1 | * | 9/2002 | Keyworth | G01S 7/521 340/436 |
| 2002/0157470 A1 | | 10/2002 | Noetzel et al. | |
| 2006/0002233 A1 | * | 1/2006 | Malard | G01C 15/008 367/128 |

(Continued)

OTHER PUBLICATIONS

International Search Report and Written Opinion for International Application No. PCT/US2017/063008, dated Feb. 2, 2018 (14 pages).

*Primary Examiner* — Ian J Lobo
(74) *Attorney, Agent, or Firm* — Neal, Gerber & Eisenberg LLP (57) ABSTRACT

A measuring device that includes in various embodiments a self supporting object attacher and an electronic measuring system supported by the self supporting object attacher. The electronic measuring system is configured to determine or enable the determination of a distance of a space between a first object on which the object attacher is positioned and a second object spaced apart from the first object.

29 Claims, 7 Drawing Sheets

(56) References Cited

U.S. PATENT DOCUMENTS

| | | | |
|---|---|---|---|
| 2008/0134740 A1* | 6/2008 | Xu | B21D 55/00 |
| | | | 72/17.3 |
| 2008/0229830 A1* | 9/2008 | Matsumoto | G01S 7/521 |
| | | | 73/584 |
| 2008/0232197 A1* | 9/2008 | Kojima | G01S 7/521 |
| | | | 367/99 |
| 2008/0295599 A1 | 12/2008 | Clasen et al. | |
| 2009/0018796 A1* | 1/2009 | Fisher | G01C 15/002 |
| | | | 702/159 |
| 2009/0088900 A1* | 4/2009 | Kim | G01S 7/521 |
| | | | 700/258 |
| 2009/0198465 A1* | 8/2009 | Decker | G05B 19/402 |
| | | | 702/84 |
| 2011/0288818 A1 | 11/2011 | Thierman et al. | |
| 2015/0204976 A1 | 7/2015 | Bösch | |

* cited by examiner

MEASURING DEVICE

PRIORITY

This application claims priority to and the benefit of U.S. Provisional Patent Application Ser. No. 62/428,754, filed Dec. 1, 2016, the entire contents of which is incorporated herein by reference.

BACKGROUND

Wood blocking is a common practice in the construction industry. Wood blocking typically includes installing one or more wooden blocks in the space between two adjacent spaced apart wooden studs. Wood blocking is commonly used for several purposes such as: (1) structural support; (2) fire blocking; (3) maintaining desire spacing between studs; (4) panel edge supports for sheets of drywall or plywood; and (5) support attachment sites for mounted objects.

Figure 1A:
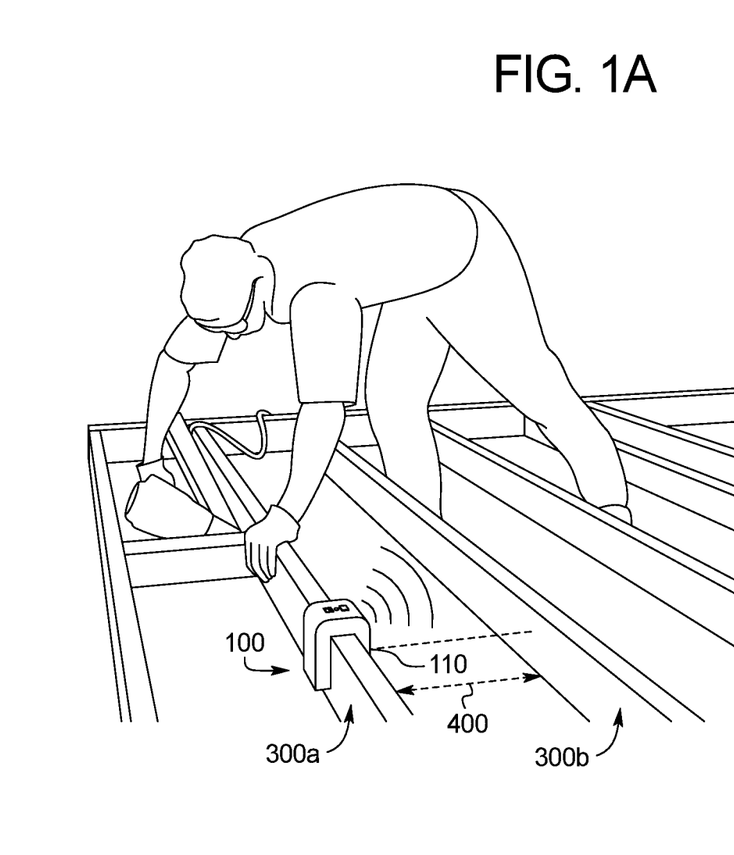
FIG. 1A is a perspective view of a cutting system at a cutting station and a self supporting measuring device of one example embodiment of the present disclosure, showing the self supporting measuring device positioned by the user on a stud in a horizontally positioned wall panel being built, transmitting data to the cutting system at the cutting station, and showing the cutting system receiving such measurement data and displaying such measurement data on a display device or monitor for reading by a cutting station operator.
Figure 1B:
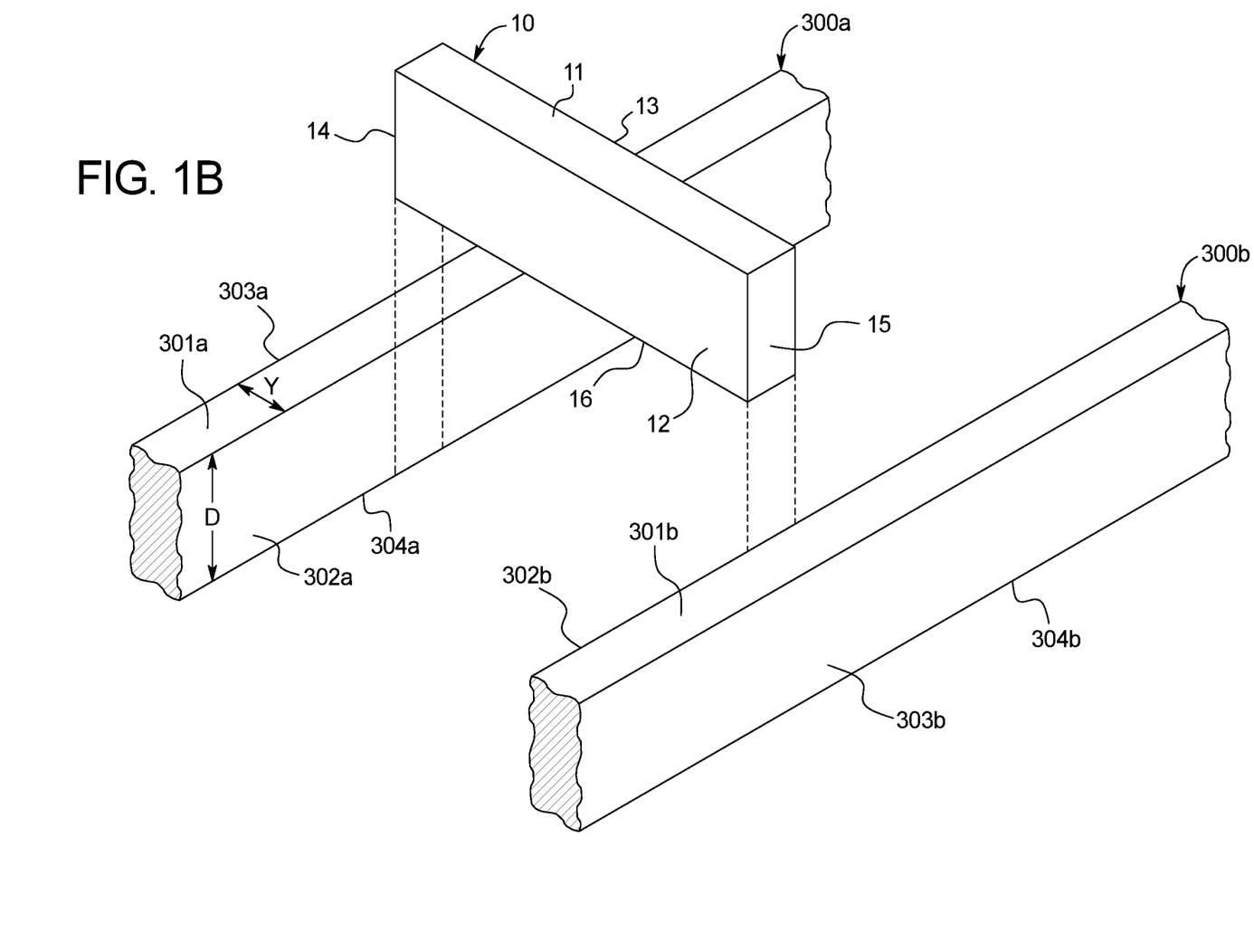
FIG. 1B is an exploded perspective view of a wooden block being positioned between two adjacent spaced apart wooden studs.

FIG. 1B illustrates a typical arrangement of a wooden block 10 positioned between two adjacent spaced apart wooden studs 300a and 300b. The wooden block 10 includes: (1) a first side 11; (2) a second side 12; (3) a third side 13; (4) a fourth side 14; (5) a fifth side 15; and (4) a sixth side 16.

The stud 300a includes: (1) a first or front side 301a; (2) a second side 302a; (3) a third side 303a; (4) a fourth or back side 304a that faces away from the first side 301a; (5) a fifth top edge side (not shown); and (6) a sixth bottom edge side (not shown).

The stud 300b includes: (1) a first or front side 301b; (2) a second side 302b; (3) a third side 303b; (4) a fourth or back side 304b that faces away from the first side 301b; (5) a fifth top edge side face (not shown); and (6) a sixth bottom edge side (not shown).

There are two generally known methods of constructing a wall panel or structure with such wooden studs and wooden blocks. One method involves constructing the wall panel or structure in an upright position where the wall panel or structure might be positioned in the final structure (i.e., on site). In such case, the wooden studs extend upright or vertically (i.e., perpendicularly to the ground), and the wooden blocks are connected to the studs such that they extend between the studs and above the ground.

The other generally known method involves constructing the wall panel or structure in a horizontal position either on site where the final wall panel or structure will be constructed or off site. In such case, the wooden studs typically extend horizontally (i.e., parallel to and on the ground or some other flat surface), and the wooden blocks are connected to the studs such that they extend between the studs. After properly positioning the wooden studs and wooden blocks of the wall panel or structure, the wall panel or structure is lifted and positioned into its upright position. The wall panel or structure can then be moved to a location where it will be used or installed.

One method of installing such a wooden block between two adjacent spaced apart wooden studs includes using a manual measuring tool such as a tape measure to measure the distance of the space between the two adjacent spaced apart wooden studs. More specifically, the user aligns one end of the tape measure along a side of one of the wooden studs and extends the tape of the tape measure to the opposite side of the other wooden stud. The user records this measurement. The user (or another person working with the user) then cuts the wooden block to that specified measurement using a cutting tool at a cutting station. The user further uses other suitable tools and materials to attach the wooden block in the space between the two adjacent spaced apart wooden studs.

One known problem with this known method is that the user can inaccurately measure the distance of the space between the two adjacent spaced apart wooden studs when using a manual measuring tool. Inaccurate measurements can result in cutting the wooden block to an incorrect length (i.e., either too long or too short). Such inaccuracies can result in wasted time and materials, and add extra expense to the overall process.

Another known problem with this known method is that when installing more than one wooden block in the space between two adjacent spaced apart wooden studs, the measurement of the distance of the space for each wooden block to be cut to may be different. This is because the two adjacent spaced apart wooden studs may not be exactly parallel to each other. Consequently, multiple measurements of the distances of the spaces at various points along the sides of the studs must be taken to ensure that each wooden block between such studs is cut to a proper length. As described above, with possible inaccuracies relating to human error in measuring and cutting, time and materials may be wasted during this process.

Another known problem with this known method is that the user must bend over repeatedly when taking measurements of the distances of the spaces between the adjacent sets of wooden studs. This repetitive process consumes time, can create an uncomfortable work environment for the user, and in certain cases can result in potential user fatigue or injury.

Accordingly, there is a need to solve the above problems.

SUMMARY

Various example embodiments of the present disclosure provide a measuring device that solves the above problems. In various embodiments of the present disclosure, the measuring device is self supporting and wireless.

In various example embodiments, the measuring device generally includes: (1) a self supporting object attacher such as an upside down generally U-shaped stud attacher; and (2) an electronic measuring system supported by the self supporting object attacher (such as the upside down U-shaped stud attacher). The electronic measuring system is configured to determine, enable, or facilitate the determination of a distance of a space between a first object on which the object attacher is positioned and a second object spaced apart from the first object.

In various embodiments, the self supporting object attacher includes: (1) a first leg; (2) a second spaced apart leg; and (3) a head. In certain embodiments, the self supporting object attacher is configured to be securely but removably positioned on one size object, and in other embodiments, the self supporting object attacher is adjustable and configured to be securely but removably positioned on anyone of a plurality of different sized objects.

In various embodiments, the electronic measuring system includes: (1) one or more proximity sensors supported by the self supporting object attacher and configured to emit a signal and detect a signal; (2) one or more transmitters supported by the upside down U-shaped stud attacher and configured to transmit data from the measuring device to another device; (3) one or more processors supported by the upside down U-shaped stud attacher and configured to run an application, such as a measuring or measurement calculating application, that enables or causes the processor(s) to calculate one or more distances of the spaces between two objects, such as the distance of the space between two adjacent spaced apart wooden studs; (4) one or more memory devices supported by the upside down U-shaped stud attacher and configured to store the measuring or measurement calculating application; (5) an on/off switch supported by the upside down U-shaped stud attacher and configured to enable a user to turn the measuring device on and off; (6) one or more activation buttons supported by the upside down U-shaped stud attacher and configured to enable a user to operate the measuring device; (7) one or more indication lights supported by the upside down U-shaped stud attacher and configured to indicate to the user one or more operations performed by the measuring device; and (9) a power source assembly supported by the upside down U-shaped stud attacher and configured to power the electrical components of the measuring device. It should be appreciated that the measuring device of the present disclosure does not need to include all of these electrical or electronic components. It should further be appreciated that the measuring device can include other electrical or electronic components. It should also be appreciated that the term stud attacher (when used herein) is not meant to limit the measuring device of the present disclosure to only be attached to studs, and that the attacher of the present disclosure can be attached to other objects besides studs.

In various embodiments, the measuring device of the present disclosure operates in a manual mode. In various alternative embodiments, the measuring device of the present disclosure operates in an automatic mode. In various alternative embodiments, the measuring device of the present disclosure operates in either the manual mode or the automatic mode.

In various alternative embodiments, the measuring device of the present disclosure is configured to simultaneously or sequentially determine multiple different measurements. For example, the measuring device can be configured to determine the distance of the space between a first stud and a second stud using a first proximity sensor and separately determine the distance of the space between the first stud and a third stud using a second proximity sensor.

In various embodiments of the present disclosure, the measuring device communicates with (such as by sending measurements data represented by signals to) a cutting system at a cutting station to enable or facilitate the cutting of one or more wooden blocks to the determined (i.e., measured and calculated) distances.

It should be appreciated that in alternative embodiments, the measuring device is attached to or attachable to one or more power and/or communication transmitting wires.

Additional features and advantages of the present invention are described in, and will be apparent from, the following Detailed Description and the Figures.

DETAILED DESCRIPTION OF EXAMPLE EMBODIMENTS

First Example Embodiment

Figure 2:
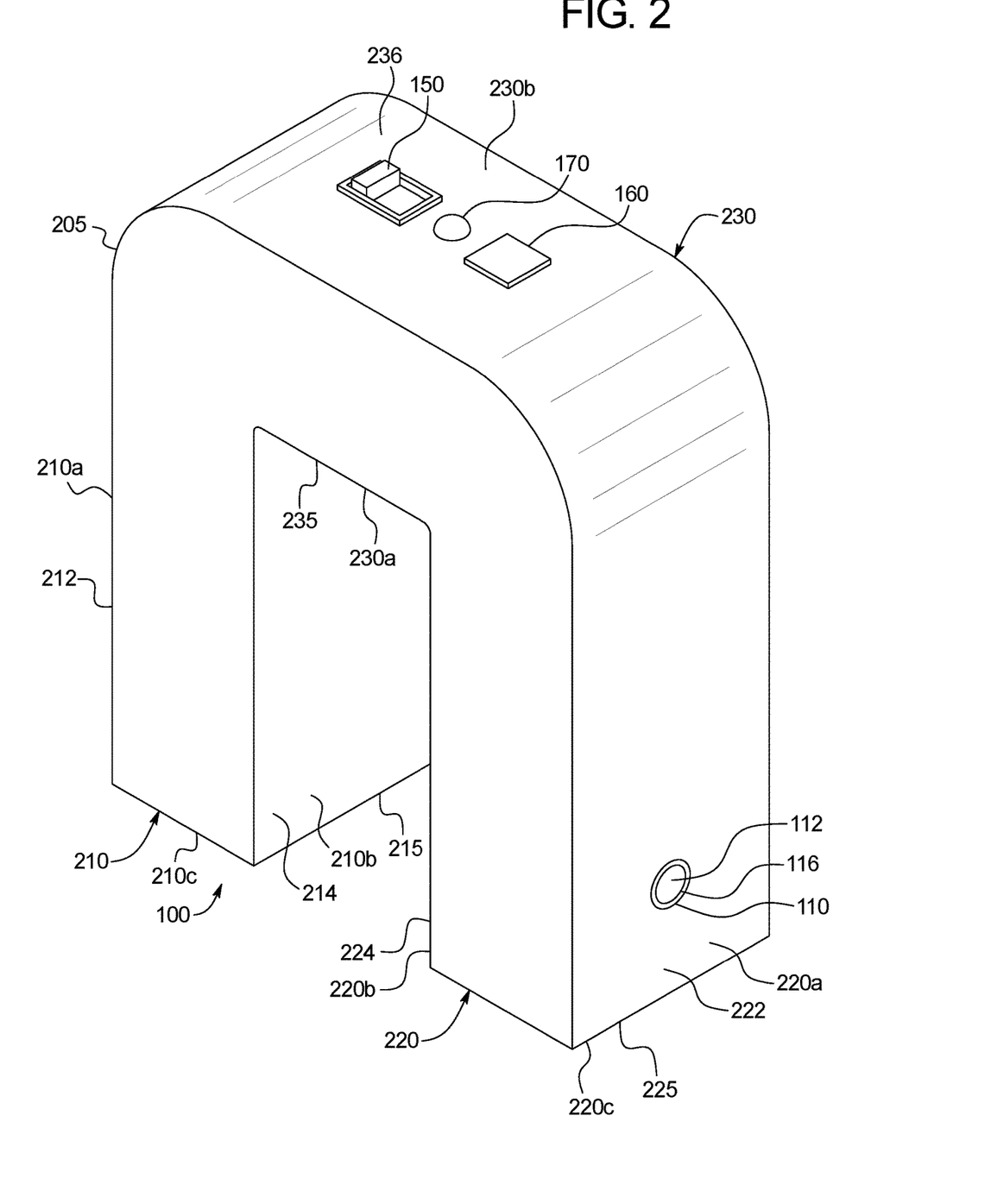
FIG. 2 is an enlarged perspective view of the measuring device of FIG. 1.
Figure 3:
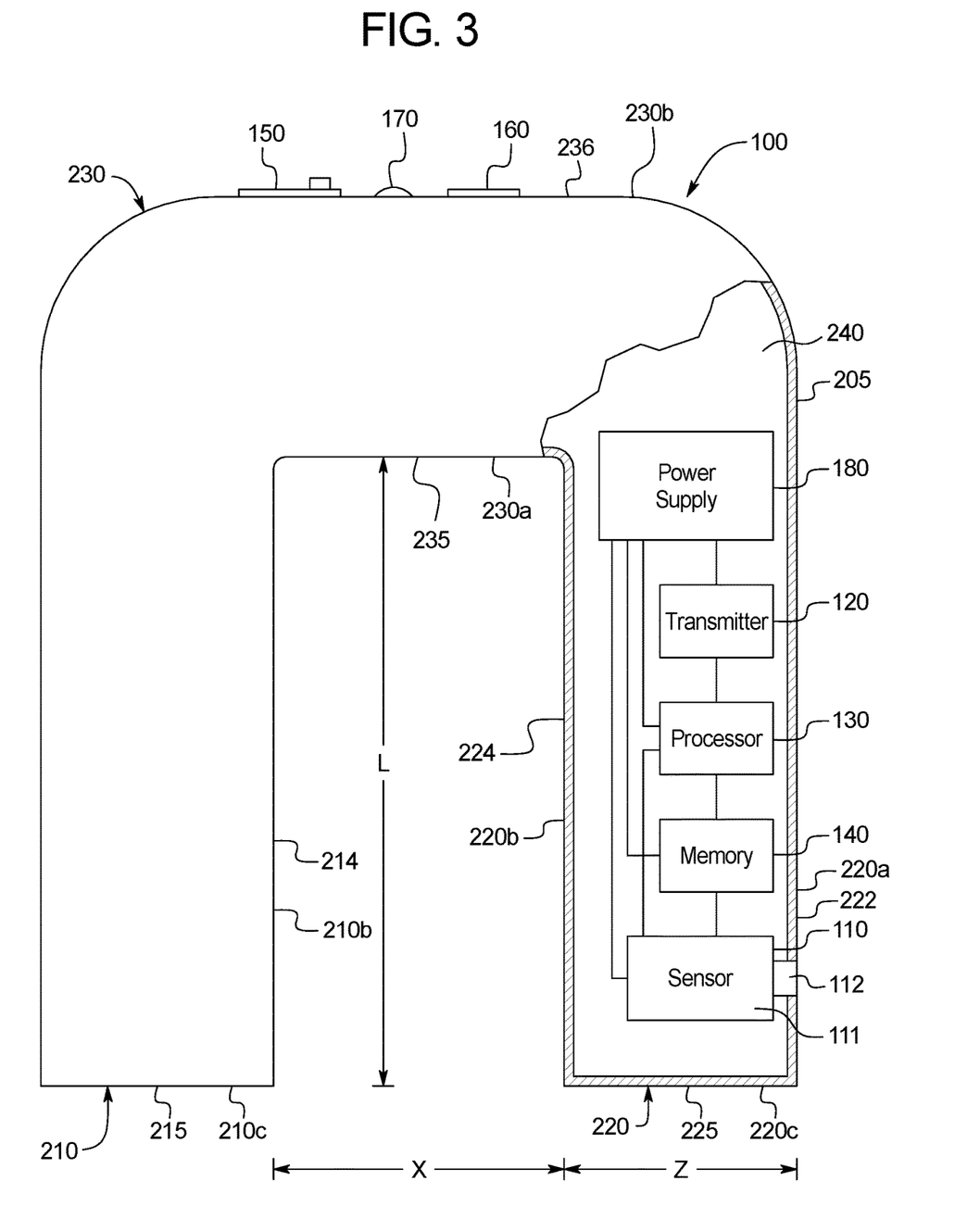
FIG. 3 is a partially fragmentary front view of the measuring device of FIG. 1, diagrammatically showing certain of the interior electrical or electronic components.
Figure 4:
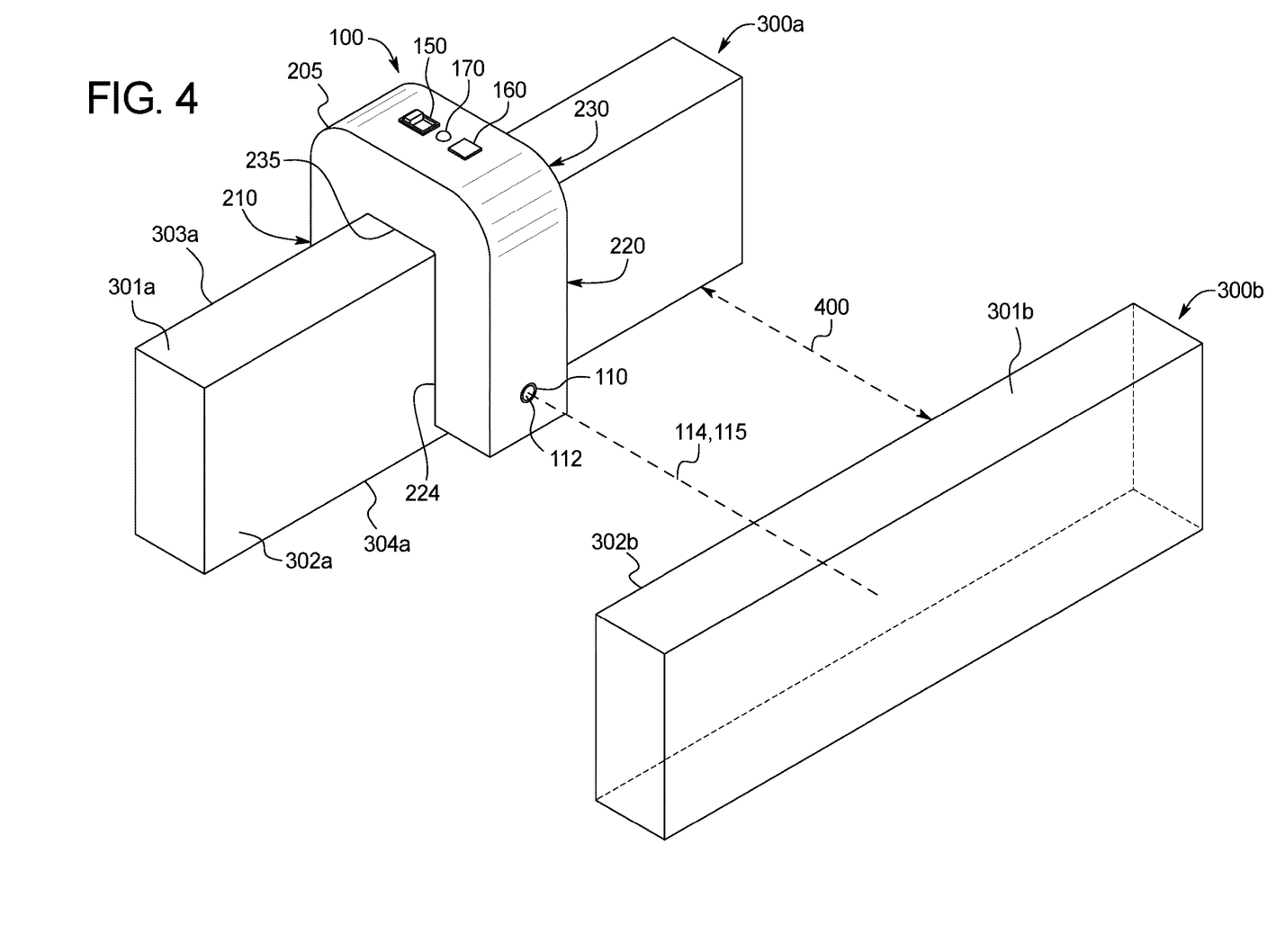
FIG. 4 is a perspective view of the measuring device of FIG. 1 positioned on a first wooden stud and measuring the distance of the space between that first wooden stud and a second stud spaced apart from the first stud.

Referring now to FIGS. 1A, 2, 3, and 4, one example embodiment of the self supporting measuring device of the present disclosure is generally indicated by numeral 100. The self supporting measuring device 100 is configured to be removably positioned on an object, such as a wooden stud 300a and to engage the sides or outer surfaces or walls of the object such as the stud 300a as generally illustrated in FIGS. 1A and 4.

The self supporting measuring device 100 of this example embodiment of the present disclosure generally includes: (1) a self supporting object attacher such as an upside down U-shaped stud attacher 205; and (2) an electronic measuring system.

For brevity, the self supporting measuring device 100 is referred to herein as the measuring device 100. For brevity, the self supporting object attacher or upside down U-shaped stud attacher may sometimes be referred to herein as the stud attacher or simply the attacher.

More specifically, in this illustrated example embodiment, the self supporting object attacher and in particular the stud attacher 205 includes: (1) a first leg 210; (2) a second spaced apart leg 220; and (3) a head 230. The first leg 210, the second leg 220, and the head 230 are integrally connected or formed in this illustrated example embodiment. The stud attacher 205 has or defines an internal cavity 240. The stud attacher can be made from any suitable material such as a suitable plastic material. In various embodiments, the stud attacher is formed from two or more separately formed sections (such as two halves) that are suitably integrally or otherwise connected.

The first leg 210 includes: (1) an outwardly facing first wall; (2) an outwardly facing second wall 210a; (3) an outwardly facing third wall; (4) an inwardly facing fourth wall 210b; and (5) a downwardly facing fifth wall 210c. All the walls of the first leg 210 include inner and outer surfaces (some of which are shown). The inwardly facing outer surface 214 of the inwardly facing fourth wall 210b is configured to engage the third side 303a of the stud 300a, as generally shown in FIG. 4 and as further discussed below.

The second leg 220 includes: (1) an outwardly facing first wall; (2) an outwardly facing second wall 220a; (3) an outwardly facing third wall; (4) an inwardly facing fourth wall 220b; and (5) a downwardly facing fifth wall 220c. All the walls of the second leg 220 include inner and outer surfaces (some of which are shown). The inwardly facing outer surface 224 of the inwardly facing fourth wall 220b is configured to engage the second side 302a of the stud 300a, as generally shown in FIG. 4 and as further discussed below. The second leg 220 supports the proximity sensor 110 as further discussed below.

The first leg 210 and the second leg 220 are or extend parallel or substantially parallel to each other in this illustrated example embodiment. In alternative embodiments, the first leg 210 and the second leg 220 can be angled toward each other to facilitate secure but removable attachment to the object, such as the wooden stud. It should be appreciated that the first leg 210 and the second leg 220 do not have to be of equal length; for example, the first leg 210 can be shorter or longer in length than the second leg 220. It should be further appreciated that the first leg 210 and the second leg 220 can be equal in length. It should also be appreciated that the legs can include one or more suitable gripping mechanisms (not shown) that facilitate engagement and secure, but temporary, attachment with the walls of the object such as the walls of the wooden stud.

The head 230 includes: (1) an outwardly facing first wall; (2) an outwardly facing second wall; (3) an outwardly facing third wall; (4) an outwardly facing fourth wall; (5) a downwardly facing fifth or bottom wall 230a; and (6) an upwardly facing sixth or top wall 230b. All walls of the head 230 include inner and outer surfaces (some of which are shown). The outer surface 235 of the fifth wall 230a is configured to engage the first side 301a of the stud 300a in this illustrated example embodiment.

In this illustrated example embodiment, the distance X (as shown in FIG. 3) between the inwardly facing outer surface 214 of the fourth wall 210b of the first leg 210 and the inwardly facing outer surface 224 of the fourth wall 220b of the second leg 220 is slightly greater than the distance Y (as shown in FIG. 1B) from the third side 303a of the stud 300a to the second side 302a of the stud 300a.

In this illustrated example embodiment, the distance L (as shown in FIG. 3) from the outer surface 215 of the fifth wall 210c of the first leg 210 to the outer surface 235 of the fifth wall 230a of the head 230 is greater than or equal to the distance D (as shown in FIG. 1B) from the fourth side 304a of the stud 300a to the first side 301a of the stud 300a.

In this illustrated example embodiment, the distance L (as shown in FIG. 3) from the outer surface 225 of the fifth wall 220c of the second leg 220 to the outer surface 235 of the fifth wall 230a of the head 230 is greater than or equal to the distance D (as shown in FIG. 1B) from the fourth side 304a of the stud 300a to the first side 301a of the stud 300a.

In this illustrated example embodiment, the fixed position of the first leg 210, the second leg 220, and the head 230 are configured to be positioned on a 2×4 wooden stud. Thus, this illustrated example embodiment of the measuring device 100 is dedicated to being securely but removably positioned on 2×4 wooden studs.

In another embodiment, the measuring device 100 can be dedicated to being securely but removably positioned on 2×6 wooden studs. In another embodiment, the measuring device 100 can be dedicated to being securely but removably positioned on 2×8 wooden studs.

Thus, it should be appreciated that various alternative embodiments of the measuring device 100 can be dedicated to being securely but removably positioned on single sized wooden studs or objects.

In various other embodiments, the measuring device 100 of the present disclosure can be adjustable so that it can be employed or positioned on multiple differently sized objects such as differently sized wooden studs. In other words, in various embodiments, the measuring device of the present disclosure is not dedicated to being positioned on any one of only one sized object, but can be securely but removably positioned on a plurality of different sized objects.

In this illustrated example embodiment, the electronic measuring system includes: (1) one or more proximity sensors, such as the proximity sensor 110, connected to and supported by the stud attacher 205; (2) one or more transmitters, such as the transmitter 120, connected to and supported by the stud attacher 205; (3) one or more processors, such as the processor 130, connected to and supported by the stud attacher 205; (4) one or more memory devices, such as the memory device 140, connected to and supported by the stud attacher 205; (5) an on/off switch 150 connected to and supported by the stud attacher 205; (6) one or more activation buttons, such as the activation button 160, connected to and supported by the stud attacher 205; (7) one or more indication lights, such as the indication light 170, connected to and supported by the stud attacher 205; and (8) one or more power source assemblies, such as the power source assembly 180, connected to and supported by the stud attacher 205. In this illustrated example embodiment, the electronic measuring system is partially positioned in the internal cavity 240 and is supported by the attacher 205. All electrical or electronic components are suitably electrically connected such that the measuring device 100 of the present disclosure performs at least the functions described within the present disclosure.

In this illustrated example embodiment, the proximity sensor 110 includes: (1) a body including a proximity sensor signal source 111; (2) a proximity sensor signal emitter 112 configured to enable an emitted signal 114 to leave the proximity sensor 110; (3) a proximity sensor signal receiver (not shown) configured to detect a reflected signal 115 deflected off of the side of the opposing stud; and (4) a cover or covering 116 configured to enclose the proximity sensor signal emitter 112 and the proximity sensor signal receiver within the body of the proximity sensor 110. In one example embodiment of the present disclosure, the proximity sensor 110 is partially connected in the internal cavity 240 of the second leg 220 of the stud attacher 205 of the measuring device 100 and partially extends through the outer surface 222 of the second wall 220a of the second leg 220. The proximity sensor signal emitter 112 faces in the same direction as the outer surface 222 of the second wall 220a of the second leg 220.

In other embodiments of the present disclosure, the proximity sensor 110 can be connected to and extend from other suitable walls of the first leg 210, the second leg 220, or the head 230 of the measuring device 100.

It should be appreciated that in certain embodiments of the present disclosure, the proximity sensor 110 includes an ultrasonic sensor. It should be further appreciated that the proximity sensor 110 can be a different proximity sensor that facilitates determining the distance between two objects in accordance with the present disclosure.

In this illustrated example embodiment, the on/off switch 150 is connected to and extends from the outer surface 236 of the top wall 230b of the head 230 of the measuring device 100. The on/off switch 150 is electrically connected to the power source assembly 180. The on/off switch 150 enables the user to control the power source assembly 180 of the measuring device 100. When the on/off switch 150 is in the "off" position, the power source assembly 180 does not transmit power to the electrical or electronic components of the measuring device 100. When the on/off switch 150 is in the "on" position, the power source assembly 180 does transmit power to the electrical or electronic components of the measuring device 100.

It should be appreciated that the on/off switch 150 can be connected to and extend from other suitable walls of the first leg 210, the second leg 220, or the head 230 of the stud attacher 205 of the measuring device 100.

In this illustrated example embodiment, the activation button 160 is connected to and extends from the outer surface 236 of the top wall 230b of the head 230. When the user engages the activation button 160, a signal is sent to the processor 130 to cause the proximity sensor 110 to emit an emitted signal 114. It should be appreciated that the measuring device 100 of the present disclosure can include one or more activation buttons 160 to enable its functions. It should be further appreciated that the one or more activation buttons 160 can be connected to and extend from other suitable walls of the first leg 210, the second leg 220, or the head 230 of the stud attacher 205 of the measuring device 100.

In this illustrated example embodiment, the indication light 170 is connected to and extends from the outer surface 236 of the top wall 230b of the head 230 of the measuring device 100. The indication light 170 indicates the one or more functions the measuring device 100 is performing. When the indication light 170 is green, the measuring device 100 is on and is measuring the distance of the space between the two adjacent, spaced apart wooden studs. When the indication light is red, the measuring device 100 is on but is not measuring the distance of the space between the two adjacent spaced apart wooden studs. It should be appreciated that other light colors can be used to indicate the performance of functions of the measuring device 100. It should be further appreciated that one or more indication lights 170 can be connected to and extend from other suitable walls of the first leg 210, the second leg 220, or the head 230 of the measuring device 100.

In this illustrated example embodiment, the power source assembly 180 supplies electric power to the electrical or electronic components of the measuring device 100. In one example embodiment of the present disclosure, the power source assembly 180 is connected in the internal cavity 240 of the stud attacher 205 of the measuring device 100. In another example embodiment of the present disclosure, the power source assembly 180 can be connected to and extend from other suitable walls of the first leg 210, the second leg 220, or the head 230 of the measuring device 100. It should be appreciated that the power source assembly 180 can include a suitable replaceable battery (not shown) and a battery holder (not shown). It should be further appreciated that the stud attacher 205 can include a suitable access area for accessing the power source assembly 180 to change the replaceable battery.

Manual Mode

Referring now specifically to FIG. 4, one example method of the present disclosure of operating or using the measuring device 100 to measure the distance of the space 400 between the two adjacent spaced apart wooden studs 300a and 300b is generally illustrated. This first example method provides a manual mode of operating the measuring device 100.

This example method of operation of the manual mode includes: (1) receiving an activation input from the on/off switch to turn the measuring device on; (2) positioning the measuring device onto the stud; (3) receiving activation input from the activation button to cause the measuring device to determine the distance of the space between the two adjacent, spaced apart wooden studs; (4) emitting an emitted signal from the proximity sensor signal emitter; (5) detecting a reflected signal by the proximity sensor signal receiver; (6) calculating the distance of the space between the adjacent, spaced apart wooden studs; and (7) transmitting data representing the calculated distance of the space to the cutting system at the cutting station.

More specifically, the method includes turning the measuring device 100 on by engaging the on/off switch 150 to the "on" position. The indication light 170 illuminates the color red when the on/off switch 150 is in the "on" position in this illustrated embodiment. When the on/off switch 150 is in the "on" position, the processor 130 retrieves the measuring application from the memory device 140 and begins running the measuring application in this example embodiment.

The method further includes positioning the measuring device 100 onto the stud 300a. More specifically, in this illustrated example the outer surface 214 of the fourth wall 210b of the first leg 210 engages the third side 303a of the stud 300a. The outer surface 235 of the fifth wall 230a of the head 230 engages the first side 301a of the stud 300a. The outer surface 224 of the fourth wall 220b of the second leg 220 engages the second side 302a of the stud 300a. The outer surface 215 of the fifth wall 210c of the first leg 210 faces in the same direction as the fourth side 304a of the stud 300a. The outer surface 225 of the fifth wall 220c of the second leg 220 faces in the same direction as the fourth side 304a of the stud 300a. The method includes positioning the measuring device 100 onto the stud 300a such that the proximity sensor signal emitter 112 of the proximity sensor 110 faces toward the second side 302b of the stud 300b.

It should be appreciated that the method can alternatively include placing the measuring device 100 onto the stud 300b. The measuring device 100 engages the stud 300b in a similar manner as it does with the stud 300a. If the measuring device 100 is positioned on the stud 300b, then the proximity sensor signal emitter 112 of the proximity sensor 110 faces toward the second side 302a of the stud 300a.

The method further includes engaging the activation button 160 to cause a determination of the distance of the space 400. Upon engaging the activation button 160, the indication light 170 illuminates the color green to indicate the performance of determining the distance of the space 400. More specifically, engagement of the activation button 160 sends a signal to the processor 130 to cause the proximity sensor signal source 111 of the proximity sensor 110 to emit an emitted signal 114 from the proximity sensor signal emitter 112. The processor 130 causes an internal clock (not shown) to begin counting when the emitted signal 114 leaves the proximity sensor signal emitter 112. The emitted signal 114 travels the distance of the space 400 toward the stud 300b until the emitted signal 114 engages the second side 302b of the stud 300b. The emitted signal 114 reflects off the second side 302b of the stud 300b and becomes the reflected signal 115. The reflected signal 115 travels the distance of the space 400 back toward the stud 300a. The proximity sensor signal receiver detects the arrival of the reflected signal 115 and signals the processor 130 the occurrence of this event. The processor 130 causes the internal clock to stop counting.

The method further includes the processor 130 calculating the distance of the space 400 as a function of the following received values: (a) a first time when the emitted signal 114 leaves the proximity sensor signal emitter 112; (b) a second time when the proximity sensor signal receiver detects the reflected signal 115; (c) the known speed of the emitted signal 114 and the reflected signal 115 (which are of the same value and are programmed in the measuring application in this illustrated example embodiment); and (d) the distance Z (as shown in FIG. 3) between where the emitted signal 114 leaves the proximity sensor signal emitter 112 and the outer surface 224 of the fourth wall 220b of the second leg of the stud attacher 205 of the measuring device 100 (which is also programmed in the measuring application in this illustrated example embodiment). Thus, the measuring device 100 takes into account the known thickness of the second leg 220 that is physically in the space between where the outer surface 224 of the fourth wall 220b of the second leg 220 engages the second side 302a of the stud 300a and where the emitted signal 114 leaves the proximity sensor signal emitter 112 (i.e., the distance Z as shown in FIG. 3) when determining the distance of the space 400.

The method further includes the processor 130 transmitting data representing this calculated distance of the space 400 to the transmitter 120. The processor 130 further causes the transmitter 120 to transmit data representing the calculated distance of the space 400 to the cutting system 720 at the cutting station 700. The cutting system 720 receives data representing the calculated distance of the space 400 and displays the calculated distance of the space 400 on the display device or monitor 710 at the cutting station 700. This enables the operator or user at the cutting station to cut the wooden block to the indicated distance or length.

Automatic Mode

An alternative method of operating or using the measuring device 100 to measure the distance of the width 400 between the two adjacent spaced part wooden studs 300a and 300b provides a partially automatic mode.

In this example embodiment, the method of operation of the automatic mode includes: (1) receiving an activation input from the on/off switch to turn the measuring device on; (2) emitting emitted signals from the proximity sensor signal emitter; (3) positioning the measuring device onto the stud (4) detecting reflected signals by the proximity sensor signal receiver; (5) continuously or regularly calculating the distance of the space between the adjacent, spaced apart wooden studs; and (6) transmitting data representing the calculated distance of the space to the cutting system at the cutting station.

More specifically, method includes engaging the on/off switch 150. When the measuring device 100 is turned on, the processor 130 retrieves the measuring application from the memory device 140 and begins running the measuring application. The processor 130 causes the proximity sensor signal source 111 to continuously or regularly emit emitted signals 114 from the proximity sensor signal emitter 112. While the proximity sensor signal source 111 continuously or regularly emits emitted signals 114 from the proximity sensor signal emitter 112, the method further includes positioning the measuring device 100 onto the wooden stud 300a or 300b, as described above. After being positioned onto the wooden stud 300a or 300b, the processor 130 continues to cause the proximity sensor signal source 111 to emit emitted signals 114 from the proximity sensor signal emitter 112. The proximity sensor signal receiver continuously or regularly detects the reflected signals 115 that reflect off the second side 302b of the stud 300b. The method further includes the processor 130 continuously or regularly calculating the distance of the space 400, using the variables described above. The processor 130 continuously or regularly transmits data representing the calculated distance of the space 400 to the transmitter 120. The processor 130 further causes the transmitter 120 to continuously or regularly or otherwise transmit data representing the calculated distance of the space 400 to the cutting system 720 at the cutting station 700 where the monitor 710 displays the calculated distance of the space 400.

It should be appreciated that the method of operation of the automatic mode can operate in programmed time intervals, where the processor 130 calculates the distance of the space 400 every 2 second, 5 seconds, 10 seconds, 15 seconds, 20 seconds, etc.

In various alternative embodiments of the present disclosure, the measuring device 100 of the present disclosure includes a second or first alternative activation button (not shown) connected to and extending from the outer surface 214 of the second wall 210b of the first leg 210, the outer surface 235 of the fifth wall 230a of the head 230, or the outer surface 224 of the fourth wall 220b of the second leg 220. In one alternative embodiment, engagement of this second or first alternative activation button by the stud 300a or 300b causes this alternative embodiment of the measuring device 100 to take a measurement of the distance of the space 400 between the two adjacent, spaced apart wooden studs 300a and 300b. More specifically, when this alternative embodiment of the measuring device 100 is positioned onto the stud 300a or 300b, the second or first alternative activation button engages a side of the stud 300a. Engagement of the second or first alternative activation button causes the processor 130 to start the measurement process by causing the proximity sensor signal source 111 of the proximity sensor 110 to emit an emitted signal 114 from the proximity sensor signal emitter 112. When this alternative embodiment of the measuring device 100 is removed from the stud 300a or 300b, the second or first alternative activation button disengages the side of the stud 300a or 300b. Upon disengagement of the second or first alternative activation button, the processor 130 causes the proximity sensor signal source 111 of the proximity sensor 110 to stop emitting the emitted signal 114 from the proximity sensor signal emitter 112.

Second Example Embodiment

Figure 5:
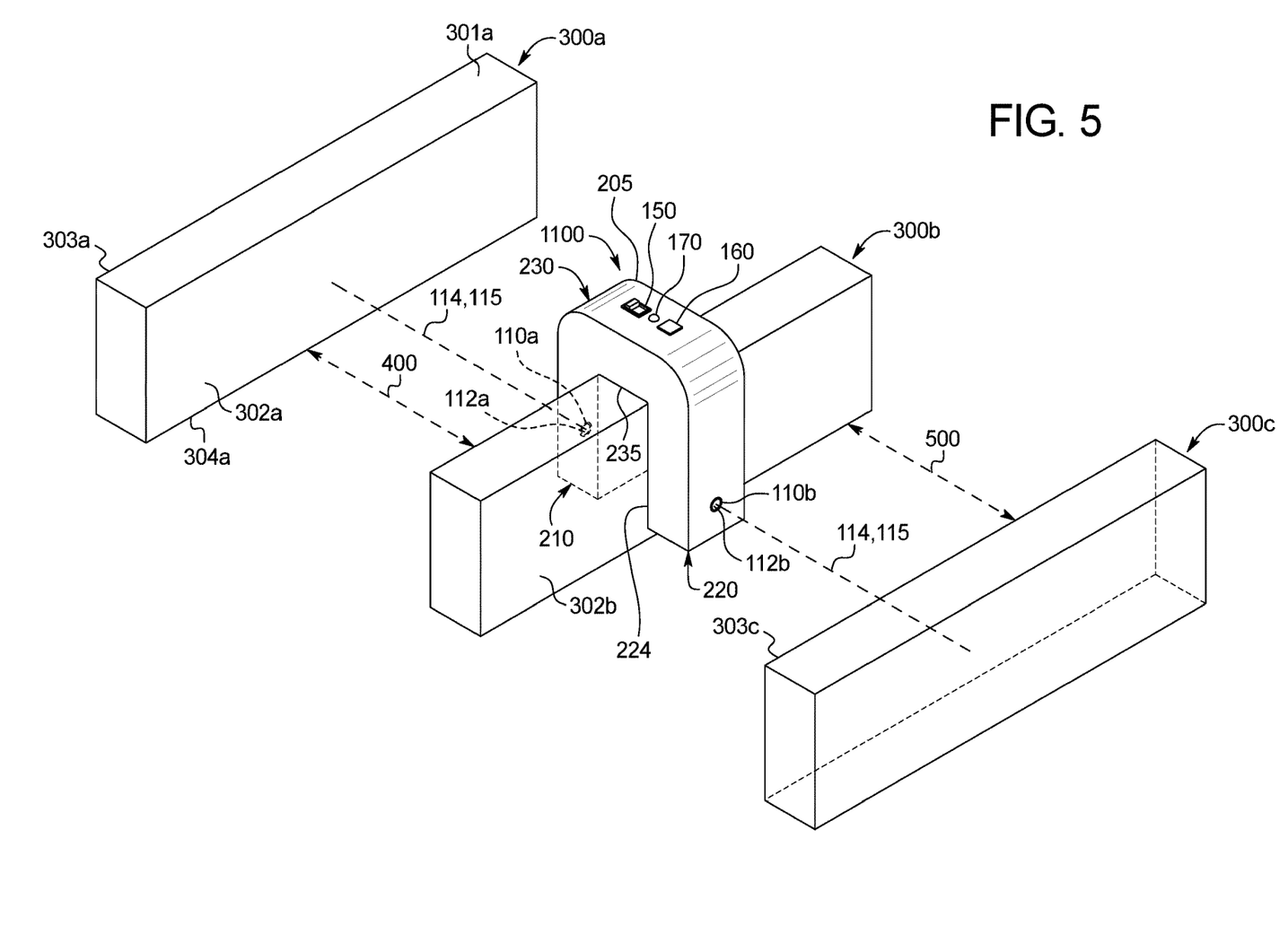
FIG. 5 is a perspective view of another example embodiment of the measuring device of the present disclosure positioned on a first wooden stud and measuring the distance of the space between that first wooden stud and a second wooden stud spaced apart from the first stud, and additionally and separately measuring the distance of the space between the first wooden stud and a third wooden stud spaced apart from the first stud.

Referring now to FIG. 5, another example embodiment of the measuring device of the present disclosure is illustrated and generally indicated by numeral 1100. The measuring device 1100 is configured to measure the distance of the space 400 between the second stud 300b and the first stud 300a and additionally a distance of the space 500 between the second stud 300b and a third stud 300c. The measuring device 1100 of this alternative example embodiment includes more than one proximity sensor, and particularly two proximity sensors including a first proximity sensor 110a connected to and supported by the first leg 210 and a second proximity sensor 110b connected to and supported by the second leg 220. The stud 300c is configured in a similar manner as the studs 300a and 300b.

The method of operating or using this alternative embodiment includes placing the measuring device 1100 onto the wooden stud 300*b* as described above. In this alternative example embodiment, the proximity sensor signal emitter 112*a* of the first proximity sensor 110*a* faces toward the second side 302*a* of the wooden stud 300*a*. The proximity sensor signal emitter 112*b* of the second proximity sensor 110*b* faces toward the third side 303*c* of the wooden stud 300*c*. The emitted signal 114 and the reflected signal 115 associated with the first proximity sensor 110*a* travel the distance of the space 400 between the wooden stud 300*a* and the wooden stud 300*b*. The emitted signal 114 and the reflected signal 115 associated with the second proximity sensor 110*b* travel the distance of the space 500 between the wooden stud 300*b* and the wooden stud 300*c*. The processor 130 of the measuring device 1100 can calculate the distance of the space 400 and the distance of the space 500 at practically the same time. Alternatively, the processor 130 of the measuring device 1100 can calculate the distance of the space 400 before or after calculating the distance of the space 500. The measuring device 1100 operates via either the manual mode or the automatic mode, as described above.

Third Example Embodiment

Figure 6:
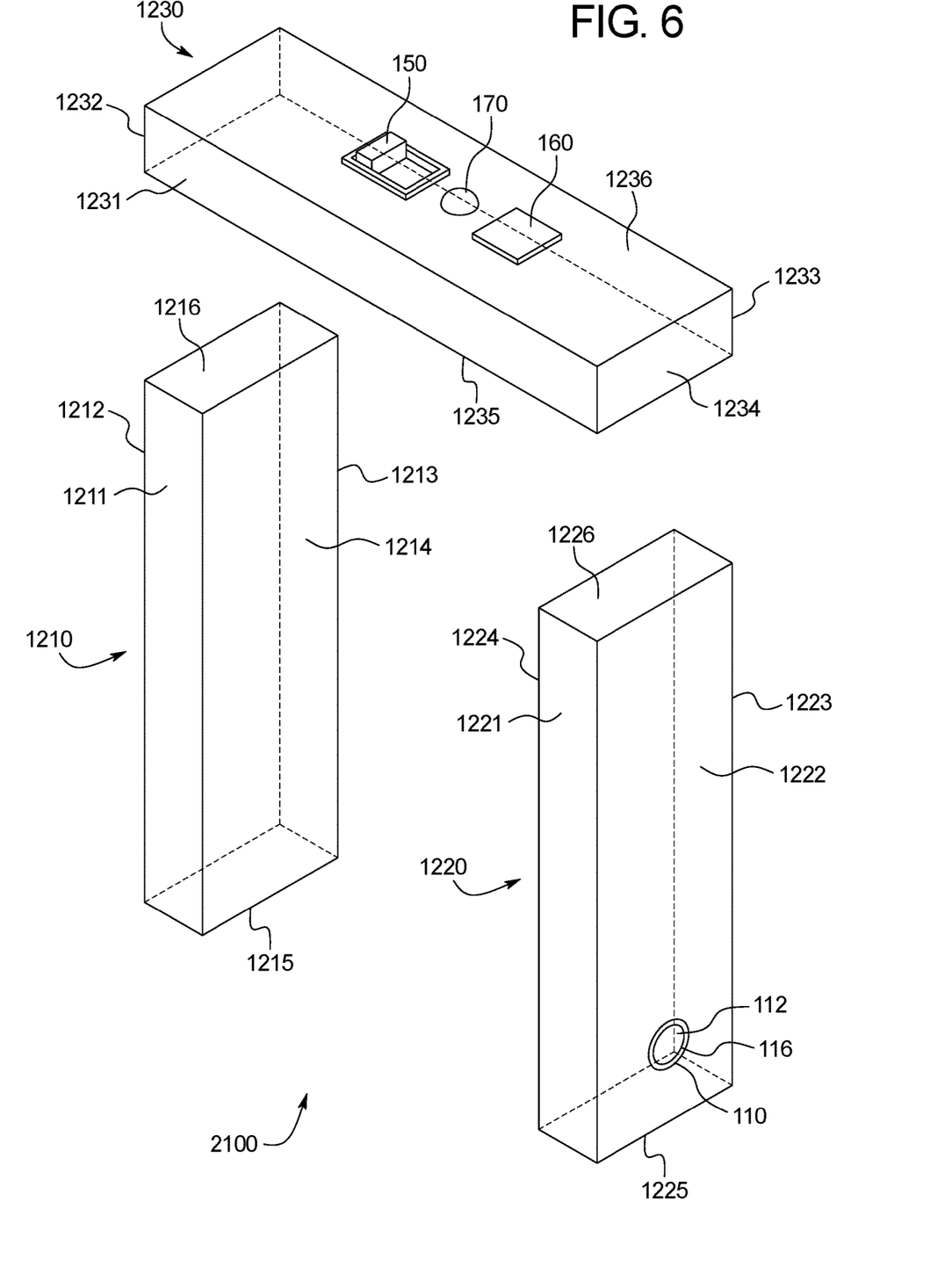
FIG. 6 is an exploded perspective view of an alternative example embodiment of the measuring device of the present disclosure.

Referring now to FIG. 6, another alternative embodiment of the measuring device of the present disclosure is illustrated and generally indicated by numeral 2100. In this illustrated example embodiment, the measuring device 2100 is formed or made of two or more, such as three separate, detachable parts including: (1) a first leg 1210; (2) a second leg 1220; and (3) a head 1230. The first leg 1210, the second leg 1220, and the head 1230 respectively include a first and second attachment mechanisms (not shown) that respectively enables the first leg 1220 to be (permanently or removably) attached to the head 1230 and the second leg 1220 to be (permanently or removably) attached to the head 1230.

More specifically, the first leg 1210 includes: (1) an outwardly facing first wall 1211; (2) an outwardly facing second wall 1212; (3) an outwardly facing third wall 1213; (4) an inwardly facing fourth wall 1214; (5) a downwardly facing fifth or bottom wall 1215; and (6) an upwardly facing sixth or top wall 1216. All of the walls of the first leg 1210 include inner and outer surfaces (not shown). The outer surface of the fourth wall 1214 is configured to engage the third side 303*a* of the stud 300*a*. The outer surface of the top wall 1216 is configured to engage an outer surface (not shown) of a fifth wall 1235 of the head 1230. The first leg 1210 can support the one or more proximity sensors 110.

The second leg 1220 includes: (1) an outwardly facing first wall 1221; (2) an outwardly facing second wall 1222; (3) an outwardly facing third wall 1223; (4) an inwardly facing fourth wall 1224; (5) a downwardly facing fifth or bottom wall 1225; and (6) an upwardly facing sixth or top wall 1226. All of the walls of the second leg 1220 include inner and outer surfaces (not shown). The outer surface of the fourth wall 1224 is configured to engage the second side 302*a* of the stud 300. The outer surface of the top wall 1226 is configured to engage the outer surface of the fifth wall 1235 of the head 1230. The second leg 1220 can support the one or more proximity sensors 110.

The head 1230 includes: (1) an outwardly facing first wall 1231; (2) an outwardly facing the second wall 1232; (3) an outwardly facing third wall 1233; (4) an outwardly facing fourth wall 1234; (5) a downwardly facing fifth or bottom wall 1235; and (6) an upwardly facing sixth or top wall 1236. All of the walls of the head 1230 include inner and outer surfaces (not shown). The outer surface of the fifth wall 1235 is configured to engage the first side 301*a* of the stud 300*a*, the outer surface of the top wall 1226 of the second leg 1220, and/or the outer surface of the top wall 1216 of the first leg 1210. This alternative embodiment functions in a similar manner as the other example embodiments described within the present disclosure.

It should be appreciated that various embodiments can include the first leg 1210 and the second leg 1220 with a suitably adjustable mechanism configured to adjust the distance between the first leg 1210 and the second leg 1220. This alternative embodiment enables the measuring device 2100 to be positioned on multiple differently sized wooden studs instead of being dedicated to being positioned on only one sized wooden stud.

Other Alternatives

It should be appreciated that the various embodiment examples of the measuring device of the present disclosure can transmit data representing: (a) a first time when the emitted signal leaves the proximity sensor signal emitter; (b) a second time when the proximity sensor signal receiver detects the reflected signal; (c) the known speed of the emitted signal and the reflected signal (which are of the same value and are programmed in the measuring application); and (d) the distance Z (as shown in FIG. 3) between where the emitted signal leaves the proximity sensor signal emitter and the outer surface of the fourth wall of the second leg of the stud attacher of the measuring device (which is programmed in the measuring application) to a portable device (not shown). In this alternative method, the portable device receives the data representing the variables (a), (b), (c), and (d) described above from the measuring device and determines the one or more distances of the spaces measured by the measuring device. The portable device can be included in the cutting system 720 at the cutting station 700, or it can be separate from the cutting system 720. If the portable device is separate from the cutting system 720, the portable device transmits the one or more calculated distances of the spaces to the cutting system 720. The portable device can be connected wirelessly or via a wire to the measuring device and/or the cutting system 720. The portable device can include a monitor that displays the calculated distance of the space. Alternatively, the portable device can transmit the calculated distance of the space to a different monitor (i.e., a monitor on the measuring device (not shown) or the monitor 710 at the cutting station 700).

It should be further appreciated that the cutting system 720 can include a manual cutting tool or an automatic cutting tool used to cut a wooden block to a length determined by the various example embodiments of the measuring device of the present disclosure.

It should be further appreciated that the various example embodiments of the measuring device and the methods of using or operating the various example embodiments of the measuring device can be controlled from a mobile device, a computer, a tablet, etc.

It should be further appreciated that the various example embodiments of the measuring device of the present disclosure can include one or more suitable monitors or display devices that display the one or more calculated distances of the spaces between adjacent, spaced apart wooden studs. In certain such embodiments, such display devices are LED display devices.

It should be further appreciated that the various example embodiments of the measuring device of the present disclosure can include an activation button that enables the measuring device to operate via the automatic mode or the manual mode.

It should be further appreciated that the outer surfaces of the walls of the first leg, second leg, head, or any combination thereof that engage with the sides of the wooden stud can include any suitable gripping material configured to support the stud attacher of the measuring device when positioned on that wooden stud.

It should be further appreciated that various example embodiments of the measuring device of the present disclosure can include one or more proximity sensors that use at least two proximity sensors to measure the same distance of the space between two objects, such as two adjacent, spaced apart wooden studs.

It should be further appreciated that the method operation of the automatic mode and/or the manual mode can include a step where engagement of an activation button sends a signal to the processor to cause the transmitter to transmit data representing the one or more calculated distances of the spaces to an automatic cutting tool at the cutting station, thus enabling the automatic cutting tool to cut a wooden block to a calculated length.

It should be further appreciated that various embodiments of the measuring device of the present disclosure can include an electronic measuring system including a transceiver configured to transmit and receive data to and from another device.

It should be further appreciated that various embodiments of the measuring device of the present disclosure can include one or more memory devices configured to store previous measurements of the one or more calculated distances of the spaces determined by the measuring device. Various embodiments can transmit data representing the one or more calculated distances of the spaces to one or more memory devices not included in the electronic measuring system of the measuring device. It should be further appreciated that the method of operation of the automatic mode and/or the manual mode can include a step involving retrieving data representing the one or more calculated distances of the spaces stored in the one or more memory devices to cut a wooden block to a previously determined calculated distance of the space.

It should be further appreciated that various embodiments of the measuring device of the present disclosure can include: (1) a first leg; (2) a second leg; and (3) a head. The first leg includes: (1) a first segment; and (2) a second segment. The second leg includes: (1) a first segment; and (2) a second segment. More specifically, the first segment of the first leg of the measuring device extends upwardly toward the head. One end of the second segment of the first leg is connected to and engages the first segment of the first leg. The opposite end of the second segment of the first leg is connected to and engages the head. The first segment of the second leg of the measuring device extends upwardly toward the head. One end of the second segment of the second leg is connected to and engages the first segment of the second leg. The opposite end of the second segment of the second leg is connected to and engages the head. The second segment of the first leg is configured to extend at an angle away from the first segment of the first leg. The second segment of the second leg is configured to extend at an angle away from the first segment of the second leg. The first leg, the second leg, and the head of this alternative embodiment are integrally connected or formed. This alternative embodiment can be formed from two or more separately formed sections such as halves that are suitably integrally connected. This alternative embodiment can be formed or made of two or more, such as three separate, detachable parts including: (1) a first leg; (2) a second leg; and (3) a head. The first leg, the second leg, and the head respectively include a first and second attachment mechanisms that respectively enables the first leg to be (permanently or removably) attached to the head and the second leg to be (permanently or removably) attached to the head.

It should be appreciated from the above, that in various embodiments, the present disclosure provides a measuring device including a self supporting object attacher configured to be positioned on a first object; and an electronic measuring system supported by the self supporting object attacher, said electronic measuring system including a proximity sensor including a signal emitter configured to emit a signal toward a second object spaced apart from the first object a signal receiver configured to detect the signal reflected off of the second object, to enable a processor to calculate a distance of a space between the first object and the second object based on: a first time when the emitted signal leaves the signal emitter, a second time when the signal receiver detects the reflected signal, a known speed of the emitted signal and the reflected signal, and a distance between where the emitted signal leaves the signal emitter and an object engagement side of the self supporting object attacher. In various such embodiments, the electronic measuring system includes the processor. In various such embodiments, the electronic measuring system includes a transmitter configured to transmit data representing the calculated distance of the space between the first object and the second object. In various such embodiments, the electronic measuring system includes a display device configured to display data representing the calculated distance of the space between the first object and the second object. In various such embodiments, the electronic measuring system includes an activation input device that is activatable to cause the signal emitter to emit the signal toward the second object. In various such embodiments, the proximity sensor is an ultrasonic sensor.

It should further be appreciated from the above, that in various embodiments, the measuring device includes a self supporting object attacher; and an electronic measuring system supported by the self supporting object attacher, said electronic measuring system including a proximity sensor and a processor, wherein the processor is configured to calculate a distance of a space between a first object on which the object attacher is positioned and a second object spaced apart from the first object. In various such embodiments, the electronic measuring system includes a transmitter configured to transmit data representing the calculated distance of the space between the first object and the second object. In various such embodiments, the electronic measuring system includes a display device configured to display data representing the calculated distance of the space between the first object and the second object. In various such embodiments, the electronic measuring system includes an activation input device that is activatable to cause the proximity sensor to emit a signal toward the second object. In various such embodiments, the processor is configured to calculate the distance of the space between the first object and the second object based on a: a first time when an emitted signal leaves a proximity sensor signal emitter of the proximity sensor, a second time when a proximity sensor signal receiver of the proximity sensor detects a reflected signal, a known speed of the emitted signal and the reflected signal, and a distance between where the emitted signal leaves the proximity sensor signal emitter and an object engagement side of the self supporting object attacher.

It should further be appreciated from the above, that in various embodiments, the measuring device includes a self supporting object attacher; and an electronic measuring system supported by the self supporting object attacher, said electronic measuring system including a proximity sensor and a transmitter configured to transmit data to enable a remote processor to calculate a distance of a space between a first object on which the object attacher is positioned and a second object spaced apart from the first object. In various such embodiments, the data represents: (a) a first time when an emitted signal leaves a proximity sensor signal emitter of the proximity sensor, and (b) a second time when a proximity sensor signal receiver of the proximity sensor detects a reflected signal. In various embodiments, the data further represents a speed of the emitted signal and the reflected signal. In various embodiments, the data further represents a distance between where the emitted signal leaves the proximity sensor signal emitter and an object engagement side of the self supporting object attacher.

It should be understood that various changes and modifications to the presently preferred example embodiments described herein will be apparent to those skilled in the art. Such change and modifications can be made without departing from the spirit and scope of the present subject matter and without diminishing its intended advantages. It is therefore intended that such changes and modifications be covered by the appended claims.

The invention claimed is:

1. A measuring device comprising:
an object attacher configured to be positioned on a first object, the object attacher including an object engagement wall and an outer wall opposing the object engagement wall; and
an electronic measuring system supported by the object attacher, said electronic measuring system including a proximity sensor positioned on the outer wall and including: (1) a signal emitter configured to emit a signal toward a second object spaced apart from the first object; and (b) a signal receiver configured to detect the signal reflected off of the second object to enable a processor to calculate a distance of a space between the first object and the second object based on: (i) a first time when the emitted signal leaves the signal emitter; (ii) a second time when the signal receiver detects the reflected signal; (iii) a speed of the emitted signal and the reflected signal; and (iv) a distance between where the emitted signal leaves the signal emitter and the object engagement wall.

2. The measuring device of claim 1, wherein the object attacher is self supporting.

3. The measuring device of claim 1, wherein the object attacher includes a head and at least one leg.

4. The measuring device of claim 3, wherein the at least one leg is detachable from the head.

5. The measuring device of claim 1, wherein the object attacher includes a head, a first leg, and a second leg spaced apart from the first leg.

6. The measuring device of claim 5, wherein the first leg and the second leg are spaced apart a distance X which is slightly greater than a distance Y which is a width of the object.

7. The measuring device of claim 5, wherein the first leg and the second leg are configured to engage opposite sides of the object.

8. The measuring device of claim 5, wherein the first leg extends parallel or substantially parallel to the second leg.

9. The measuring device of claim 1, wherein the electronic measuring system includes the processor.

10. The measuring device of claim 9, wherein the electronic measuring system includes a transmitter configured to transmit data representing the calculated distance of the space between the first object and the second object.

11. The measuring device of claim 9, wherein the electronic measuring system includes a display device configured to display data representing the calculated distance of the space between the first object and the second object.

12. The measuring device of claim 1, wherein the electronic measuring system includes an activation input device that is activatable to cause the signal emitter to emit the signal toward the second object.

13. The measuring device of claim 1, wherein the proximity sensor includes an ultrasonic sensor.

14. A measuring device comprising:
an object attacher, wherein the object attacher is self-supporting; and
an electronic measuring system supported by the object attacher, said electronic measuring system including a proximity sensor and a processor, wherein the processor is configured to calculate a distance of a space between a first object on which the object attacher is positioned and a second object spaced apart from the first object, wherein the proximity sensor is attached to a wall of the object attacher that is configure to not face the first object.

15. The measuring device of claim 14, wherein the object attacher includes a head and at least one leg.

16. The measuring device of claim 15, wherein the at least one leg is detachable from the head.

17. The measuring device of claim 14, wherein the object attacher includes a head, a first leg, and a second leg spaced apart from the first leg.

18. The measuring device of claim 17, wherein the first leg and the second leg are spaced apart a distance X which is slightly greater than a distance Y which is a width of the object.

19. The measuring device of claim 17, wherein the first leg and the second leg are configured to engage opposite sides of the object.

20. The measuring device of claim 17, wherein the first leg extends parallel or substantially parallel to the second leg.

21. The measuring device of claim 14, wherein the electronic measuring system includes a transmitter configured to transmit data representing the calculated distance of the space between the first object and the second object.

22. The measuring device of claim 14, wherein the electronic measuring system includes a display device configured to display data representing the calculated distance of the space between the first object and the second object.

23. The measuring device of claim 14, wherein the electronic measuring system includes an activation input device that is activatable to cause the proximity sensor to emit a signal toward the second object.

24. The measuring device of claim 14, wherein the processor is configured to calculate the distance of the space between the first object and the second object based on: (i) a first time when an emitted signal leaves a proximity sensor signal emitter of the proximity sensor; (ii) a second time when a proximity sensor signal receiver of the proximity sensor detects a reflected signal; (iii) a speed of the emitted signal and the reflected signal; and (iv) a distance between where the emitted signal leaves the proximity sensor signal emitter and an object engagement wall of the object attacher.

25. A measuring device comprising:
an object attacher, wherein the object attacher is self-supporting; and
an electronic measuring system supported by the object attacher, said electronic measuring system including a proximity sensor and a transmitter configured to transmit data to enable a remote processor to calculate a distance of a space between a first object on which the object attacher is positioned and a second object spaced apart from the first object.

26. The measuring device of claim 25, wherein the data represents:
(a) a first time when an emitted signal leaves a proximity sensor signal emitter of the proximity sensor, and
(b) a second time when a proximity sensor signal receiver of the proximity sensor detects a reflected signal.

27. The measuring device of claim 25, wherein the data further represents a speed of the emitted signal and the reflected signal.

28. The measuring device of claim 25, wherein the data further represents a distance between where the emitted signal leaves the proximity sensor signal emitter and an object engagement wall of the object attacher.

29. The measuring device of claim 25, wherein the proximity sensor is attached to a wall of the object attacher that does not face the first object.

* * * * *